June 5, 1962   G. F. ELSTON ET AL   3,037,527
POWER TRANSMISSION
Filed April 13, 1959   2 Sheets-Sheet 1
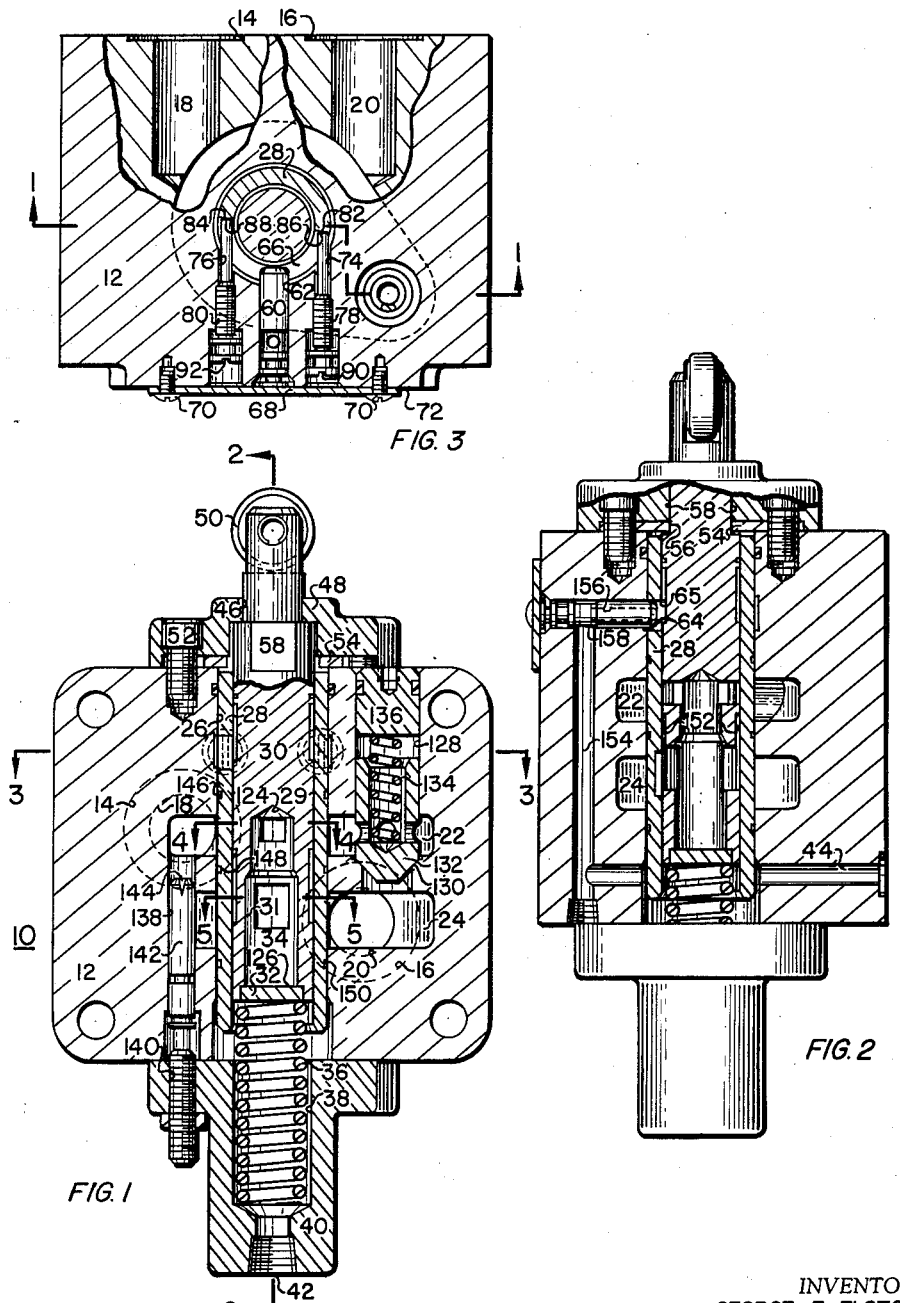
INVENTORS
GEORGE F. ELSTON
GERALD F. TESS
BY
ATTORNEYS June 5, 1962 G. F. ELSTON ET AL 3,037,527
POWER TRANSMISSION
Filed April 13, 1959 2 Sheets-Sheet 2

INVENTORS
GEORGE F. ELSTON
GERALD F. TESS
BY
ATTORNEYS 3,037,527
POWER TRANSMISSION
George F. Elston, Birmingham, and Gerald F. Tess, Roseville, Mich., assignors to Vickers Incorporated, Detroit, Mich., a corporation of Michigan
Filed Apr. 13, 1959, Ser. No. 805,867
7 Claims. (Cl. 137—637.4)

This invention relates to power transmissions, and is particularly applicable to those of the type comprising two or more fluid pressure energy translating devices, one of which may function as a pump and another as a fluid motor.

The invention is generally concerned with flow control valves and is more particularly concerned with throttle valves which have a wide use in hydraulic machine tool drives, such as for decelerating a fluid motor near the end of its stroke or prior to the beginning of a feed movement. Because of this wide use in machine tool drives for the purposes stated, such throttling devices have become well-known as deceleration valves.

Valves of this type are generally placed in a motor return conduit and may be cam actuated for the purpose of variably restricting and cutting off flow from an inlet port to an outlet port of the valve. When the valve has been actuated to a throttling position sufficient to increase pressure ahead of the valve to the setting of a relief or bypass valve in the system, the bypass valve is actuated to bypass pump displacement ahead of the motor, in increasing amounts as the deceleration valve is continued to be actuated for decelerating the motor. The deceleration valve may, of course, be shifted to a position completely closing the inlet port from the outlet port for stopping the motor. When such a valve is used for deceleration purposes in a feed circuit, a separate flow control valve may be utilized for accurately controlling the feed movement of the motor.

It has been a problem in the past to provide a deceleration valve adaptable for the wide volumetric and pressure ranges encountered in various system applications, and thus several models of deceleration valves in different sizes and capacity ratings were provided for the stepped volumetric ranges. It is apparent that savings and economies in manufacturing, stockpiling, and distribution were lost that could result through providing one deceleration valve, rather than several valves, adaptable for a wide range of system applications.

Although each model valve was adapted to more accurately control flow within the narrower range for which it was designed, there still remained the problem of obtaining desired motor deceleration curves for predetermined ranges of valve spool deflection, within each stepped volumetric range. For example, in systems incorporating a valve for controlling a volumetric range of 20 to 30 gallons, the range of valve spool deflection from wide open to throttling position, during which pressure is built up to relief valve pressure, and from throttling position to completely closed position, during which range the motor is decelerated to a stop position, would necessarily vary in a 20-gallon system from a 30-gallon system, because the throttling opening of the valve has been varied solely through shifting of the valve spool.

It is therefore an object of this invention to provide an improved throttling or deceleration valve.

It is also an object of this invention to provide a throttling or deceleration valve which is adjustable to meet a wide range of volumetric and pressure applications.

It is a further object of this invention to provide an improved deceleration valve for meeting a wide range of volumetric and pressure applications which may be conveniently adjusted to provide smooth motor deceleration within a selected valve spool deflection range.

It is still another object of this invention to provide an improved deceleration valve of the type stated, having a needle valve bleed-off adjustable from an ineffective fully closed position to various bleed-off throttling positions to meet special applications, and also a check valve for providing uncontrolled free flow in one direction.

It is also an object of this invention to provide an improved throttling valve having a sleeve and hollow spool or plunger valve with conjointly arranged porting, and wherein convenient means are provided so that the sleeve may be manually rotatably adjusted and locked to the adjusted position for varying the width of the throttling port, and wherein the valve spool telescopically mounted within the sleeve is shiftable axially to vary the length of the throttling port.

It is a further object of this invention to provide a throttling or deceleration valve of the type previously stated which is axially and radially balanced for alleviating binding and for providing low force operation of the same under a wide range of volumetric and pressure conditions.

It is also an object of this invention to provide an improved throttling or deceleration valve which is compact and economical to manufacture, which is designed to meet a wide range of volumetric and pressure requirements, and which is efficient in operation over a long life.

Further objects and advantages of the present invention will be apparent from the following description, reference being had to the accompanying drawings wherein a preferred form of the present invention is clearly shown.

In the drawings:

FIGURE 1 is a sectional view of a preferred form of the present invention taken on line 1—1 of FIGURE 3.

FIGURE 2 is a sectional view taken on line 2—2 of FIGURE 1.

FIGURE 3 is a sectional view taken on line 3—3 of FIGURE 1.

Figure 4:
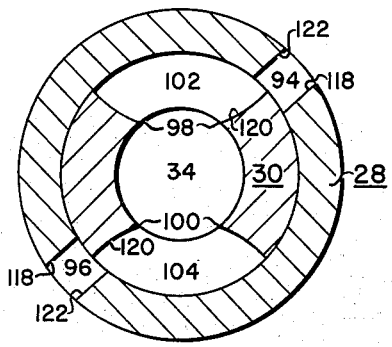
FIGURE 4 is a partial sectional view taken on line 4—4 of FIGURE 1 illustrating positional relationship of sleeve and valve spool porting.

Referring now to FIGURES 1 and 2 of the drawings, there is shown a throttling or deceleration valve, indicated generally by the numeral 10, the body 12 of which is provided on one face of the valve with external connection inlet and output ports 14 and 16, shown in dotted lines in FIGURE 1, which are respectively connected by separate inlet and outlet passages 18 and 20 to spaced apart, enlarged inlet and outlet cores or recesses 22 and 24 surrounding the periphery of a cylindrical bore 26 extending completely through the body. Rotatably mounted within the bore 26 is a cylindrical hollow sleeve member 28, the bore 29 of which is open at its opposite ends, and within which bore a valve spool or piston 30 of the plunger type is telescopically mounted. The valve spool 30 is provided with a blind stepped bore 31 extending into the spool from its lower end, as viewed in FIGURES 1 and 2, the open end of which is closed by a brazed disc 32 to form within the spool 30 an enclosed chamber 34. The valve spool 30 is resiliently biased to the position shown by a coil spring 36 in abutment against the closed end valve surface 32. The spring 36 extends from the body 12 into a stepped bore 38 of an end cover member 40, suitably fastened to the body 12, the bore 38 having an opening registering with the body bore 26, and the opposite open end of the bore 38 being threaded to form a drain port 42. When the deceleration valve is gasket mounted, the drain port 42 may be plugged, in which case a drain passage 44 connected to the lower end of bore 26, as shown in FIGURE 2, is utilized as the drain port.

The valve spool 30 extends from the upper end of the body 12 through a bore 46 of an end cover 48 opposed to end cover 40, and is slotted at its extreme end portion to receive a roller 50, so that the valve spool 30 may be actuated by a cam of suitable design in the well-known manner. The end cover 48 is maintained on the body 12 by screws 52 which also serve to maintain, between the cover 48 and the body mounting surface for the cover plate, a thin plate member 54. The plate member 54 is perforated, as indicated by the numeral 56, so as to engage opposing flat sides 58 formed upon the upper end of the valve spool 30 and thus prevent rotation of but permit reciprocation of the valve spool. The valve spool 30 and sleeve 28 have conjointly arranged porting, to be later explained, which overlap each other, and the plate member thus serves to position the spool relative to the sleeve on assembly of the valve. The sleeve illustrated is shorter in length than the body bore 26 and is located axially in the position shown by a pin member 60, slidable into a bore 62 of the body transverse to the longitudinal bore 26 (shown in FIGURE 3), with the inner end 64 of the pin inserted into a slot 66 milled halfway into the sleeve so as to engage the upper wall surface 65 of the slot. The pin 60 may be maintained in the bore 62 by a name plate 68 fastened by screws 70 to the body surface 72.

Spaced apart from the pin hole 62 on either side thereof, are two tapped holes 74 and 76 extending in the same plane from body surface 72, which also intersect the valve bore 26, threaded into which are two relatively long, adjusting screws 78 and 80. The sleeve 28 is positioned axially by pin member 60 so that end surfaces 82 and 84 of the threaded adjusting members 78 and 80 slid into the slot 66 for respectively engaging end surfaces 86 and 88 of the milled slot 66. When the name plate is removed, adjusting slots, indicated by the numerals 90 and 92 of the screw members 78 and 80, are exposed. The adjusting screw 78 may be loosened or rotated by a suitable tool inserted in the screw slot 90 so as to shift the same toward the body surface 72, and the adjusting screw 80 threaded inwardly by insertion of the tool in the screw slot 92 so as to shift the same away from the body surface and thus rotate the sleeve 28 clockwise, as viewed in FIGURE 3. This procedure may be reversed for rotating the sleeve counterclockwise. When the desired adjustment is completed, one of the screws 78 or 80 is threaded inwardly to maintain the respective end surfaces of the adjusting members 78 and 80 in engagement with the end surfaces 86 and 88 of the milled slot for locking the sleeve in adjusted position. This adjusting feature, as it relates to the conjointly arranged porting of the sleeve and valve spool, will be later explained in more detail.

Referring now to the inlet and outlet porting of the sleeve and valve spool, the sleeve 28 is provided with two radially disposed, diametrically opposed, rectilinear inlet ports 94 and 96 extending completely through the wall of the sleeve 28. The sleeve inlet ports 94 and 96 are adapted to directly overlie and register respectively with two radially disposed, diametrically opposed, inlet ports 98 and 100 of the valve spool 30, when the valve device is in the wide-open position. The spool inlet ports 98 and 100 open internally to the valve spool chamber 34 and may be formed by milling two diametrically opposed slots 102 and 104 in the valve spool.

Both the valve sleeve 28 and the valve spool 30 are provided with two radially disposed, diametrically opposed, outlet ports spaced apart from and below their respective inlet ports, as viewed in FIGURES 1 and 2. The sleeve outlet ports register with the valve spool outlet ports in the same manner as the inlet ports, and the outlet ports of the valve spool also open interiorly to the valve spool chamber 34. The outlet ports of the sleeve and valve spool are formed by milling diametrically opposed slots in the sleeve and the valve spool. The outlet slots of the valve sleeve are indicated by the numerals 103 and 105 while the diametrically opposed, rectilinear outlet ports formed by the outlet slots are respectively indicated by the numerals 106 and 108. The outlet slots of the valve spool are indicated by the numerals 110 and 112, while the diametrically opposed, rectilinear outlet ports formed by the slots are respectively indicated by the numerals 114 and 116. The sleeve is located or positioned axially in the bore 26 by the pin 60 so that the opposed inlet ports 94 and 96 of the sleeve are in constant communication with the annular inlet recess 22 surrounding the valve sleeve bore 26 and so that the annular outlet recess 24 is in constant communication with the opposed sleeve outlet ports 106 and 108.

Figure 5:
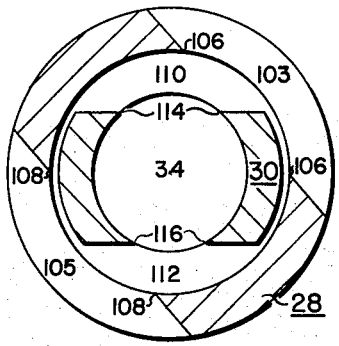
FIGURE 5 is a partial sectional view taken on line 5—5 of FIGURE 1 further illustrating positional relationship of the conjointly arranged porting of the sleeve and valve spool.
Figure 6:
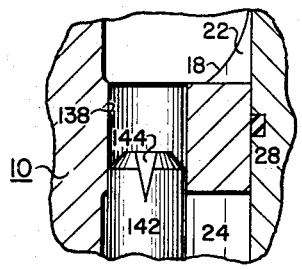
FIGURE 6 is an enlarged sectional view of the needle valve shown in FIGURE 1.

As shown in FIGURES 3, 4 and 5, sleeve 28 has been rotated slightly clockwise by first loosening screw 78 and tightening or shifting screw 80 axially away from the valve body surface 72. End surface 84 of adjusting screw 80 engages end surface 88 of the milled slot 66 for rotating the sleeve 28 clockwise to the position shown. Adjusting screw 78 is then tightened or shifted toward the sleeve so that the end surface 82 of the screw engages end surface 86 of the milled slot 66 for locking the sleeve 28 to the adjusted position for slightly decreasing the width of the inlet porting of the valve sleeve 28.

Referring to FIGURE 4, it can be seen that the effective width of the valve sleeve inlet ports 94 and 96 have been decreased to that extent or amount that the side wall edge surfaces of the sleeve inlet ports, indicated by the numeral 118, have passed over or beyond the side wall edge surfaces of the valve spool inlet slots, indicated by the numeral 120. The effective width of the sleeve inlet ports has thus been narrowed to the spacing between the outer edge of the valve spool inlet slot wall surface 120 and the inner edge of the valve sleeve inlet port surface, indicated by the numeral 122. Further rotation of the sleeve 28 will, of course, further decrease the effective width of the sleeve inlet ports.

The outlet ports 106 and 108 of the sleeve 114 and 116 of the valve spool are made sufficiently large so that the pressure drop from the inlet chamber 34 of the valve spool across the valve sleeve outlet ports 106 and 108, even to adjusted positions, is inconsequential; nevertheless, the outlet port size is decreased in width when the sleeve is rotated. However, even with the sleeve inlet port completely closed, the sleeve outlet port remains open. The sleeve 28 may be originally adjusted to provide a wide open inlet port condition for the largest volume requirement and may be adjusted to close the width of the inlet ports increasingly with lower system volumetric requirements. Axial deflection of the valve spool 30 will decrease the length of the inlet ports. Regardless of the volumetric and pressure conditions encountered in various systems, the width of the inlet port may be adjusted to provide a predetermined pressure drop from the sleeve inlet ports across the sleeve outlet ports, for example, approximately 50 p.s.i. to 60 p.s.i. for volumes of from 1 to 20 gallons, and during an axial valve spool deflection of approximately 3/16 of an inch pressure will gradually rise at the inlet port to 1000 p.s.i. Further deflection of the valve spool from 3/16 of an inch to approximately 7/32 of an inch provides a sharp ascending pressure rise at the sleeve inlet port of from 1000 p.s.i. to 3000 p.s.i. The pressure drop across the valve in the higher volumetric ranges above 25 gallons per minute even when wide open, of course, will increase, but the important feature is that the spool deflection to provide a desirable motor deceleration curve can remain substantially the same through the complete volumetric and pressure range or can be varied at will.

Figure 7:
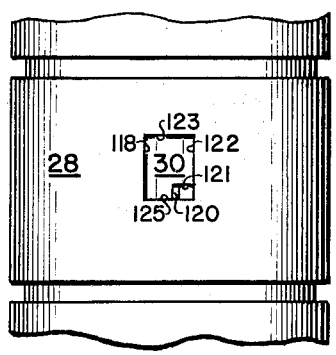
FIGURE 7 is a rotated frontal view of FIGURE 4 showing the relative position of porting when the valve spool is depressed approximately 75% from the wide open position.

When the valve spool 30 is shifted downwardly, as viewed in FIGURES 1 and 2, the effective length of the rectilinear sleeve inlet ports 94 and 96 is decreased and with continued shifting of the valve spool 30, the effective cross sectional area of the sleeve inlet port is decreased to an extent providing a throttling action great enough to cause actuation of a relief valve provided in the system for bypassing pump displacement to decelerate the motor. As the valve spool 30 is shifted downwardly, the upper wall surface of the slot of the valve spool forming the valve spool inlet ports 98 and 100, indicated in FIGURE 7 by the numeral 121, passes beyond the upper wall surface of the valve sleeve rectilinear inlet ports 94 and 96, indicated by the numeral 123, so that the effective length of the valve sleeve inlet ports has been decreased to an extent now comprising the spacing between the wall surface 121 of the valve spool inlet port and the lower wall surface 125 of the valve sleeve inlet port. The valve spool, of course, may be shifted to a position completely closing off the valve sleeve inlet port for the purpose of stopping the motor.

Although in describing the adjustable porting features of the device it has been stated that the effective width of the sleeve inlet port is changed by rotating the sleeve and that the effective length of the same port is changed by shifting the valve spool, in essence, the sleeve inlet port and underlying valve spool inlet port together form a single throttling port. When the valve sleeve is rotated, the surfaces surrounding the valve spool inlet port on two sides thereof, act as a shutter for the valve sleeve inlet port, which surface depending on the direction of rotation for adjustments. When the valve spool is shifted downwardly, the surface of the valve spool immediately above the valve spool inlet port also acts as a shutter for the valve sleeve inlet port to decrease the length of said port. The sleeve and valve spool inlet ports thus together form a throttling port and should be so considered.

The valve spool and sleeve are substantially balanced both radially and axially inasmuch as the high pressure inlet and the low pressure outlet recesses completely surround the sleeve; the sleeve and spool are not exposed at opposite ends to high pressure; and because the two opposed surfaces of the inner valve chamber 34, the upper of which is indicated by the numeral 124 while the lower is indicated by the numeral 126, provide internal, axial pressure load balance. As high pressure is not present at the opposite end of the spool, no difficulty is encountered on shifting the valve through its various throttling positions.

For the purpose of providing free flow from the valve body outlet port 16 to the inlet port 14 of the valve body, a check valve mounting bore 128 is provided extending from the surface of the body on which cover 48 is mounted and located at one side of the valve spool bore which intersects both the inlet recess 22 and the outlet recess 24 to from a valve seat indicated by the numeral 130. Mounted within the bore 128 is a poppet type check valve 132 maintained on the seat 130 by a spring 134 which is maintained in engagement against the check valve by a plug 136 closing the upper end of bore 128. The check valve 132 prevents flow from the inlet recess 22 to the outlet recess 24, but when flow is directed to outlet port 16, the check valve 132 may be lifted to permit free flow to the inlet recess 22 around the valve sleeve 28 to the inlet passage 18 and thence to a return source through external connection inlet port 14. It should be noted that for applications not requiring the check valve, that the check valve assembly may be omitted and a plug inserted in the bore 128.

The throttling valve device is also provided with a needle valve which may be utilized for special applications requiring a constant bleed; or which may be kept in the closed position and opened to provide a slight bleed in cases where the motor has not completed the end of its stroke, when the valve sleeve inlet port has been completely closed; or it may be utilized for adjusting the stroke of the motor. For this purpose the body 12 is provided with a bore 138 extending from the surface of the body on which cover 40 is mounted, which intersects both the inlet and outlet recesses 22 and 24 on the inlet port and inlet passage side of the body. The cover 40 is also provided with a drilled hole 140 adapted to register with the bore 138. Inserted into the bore 138 is a needle valve, indicated generally by the numeral 142, provided with a V-shaped notch 144 located at its extreme upper end. The portion of the needle valve extending through the valve cover 40 is threaded as is the drilled hole 140 for the purpose of rotating the needle valve, thus shifting the same inwardly to shift the notch 144 out of communication with the outlet recess 24, or shifting the same toward the cover 40 to provide communication of the notch with the recess 24. In the position shown in FIGURE 1, the needle valve has been opened slightly so that a slight amount of fluid entering the valve device from inlet connection port 14 to the inlet recess 22 by means of inlet passage 18 may bleed through the notch 144 to the outlet recess 24 which is directly connected to the outlet conection port 16 by the passage 20. The portion 140 of the needle valve extends from the cover 40 for the purpose of manually operating and adjusting the needle valve.

Sealing means are provided between the sleeve 28 and bore 26 by O-ring seals 146 and 148 located in spaced apart grooves in the outer periphery of the sleeve above and below the inlet recess 22 and by another sleeve O-ring seal 150 located below the outlet recess 24. In order to prevent pressure bind when the spool 30 is initially shifted, a small recess 152 may be provided in the periphery of the valve spool opening to the outlet ports of the sleeve and which closes off when the valve spool is shifted. A drain passage 154 may also be provided connecting the valve sleeve locating pin bore 64 with the drain passage 44 and the open end of valve sleeve bore 26. The pin 60 is hollow and is provided with an opening 156 at the sleeve slot engaging portion and with radial ports 158 opening to the drain passage 154.

There has thus been provided an improved deceleration valve which will accurately control and throttle flow through a wide volumetric range. This is accomplished by correlated throttle porting within a telescopically arranged sleeve and valve spool, the sleeve of which is rotatably adjustable relative to the valve spool to decrease the width of the throttling port and the spool of which is shiftable axially relative to the sleeve for decreasing the length of the throttle port. The adjustment to the sleeve is made by two adjusting screws for regulating the valve to meet the volumetric requirement of a particular system application. The amount of valve spool deflection for shifting the spool to a motor throttling position can also be adjusted by original sleeve adjustment determining the width of the throttling port. The needle valve may also be utilized where slight constant bleed off is beneficial or may be maintained in closed position and adjusted to the open position, for alleviating length of motor stroke problems encountered in such systems.

While the form of embodiment of the invention as herein disclosed constitutes a preferred form, it is to be understood that other forms might be adopted, all coming within the scope of the claims which follow.

What is claimed is as follows:

1. An adjustable throttle valve for controlling fluid flow comprising: a body member having inlet and outlet passages; a sleeve member rotatably mounted in the body, and a plunger valve telescopically resiliently mounted in the sleeve, said plunger having an internal chamber; radially disposed, axially spaced apart, inlet and outlet ports in the sleeve and plunger valve, said sleeve ports being separately continuously connected to the body passages and directly overlying the valve ports, which open to the chamber, in the wide open position of the throttling valve, one of said sleeve and associated underlying valve ports together forming a throttling port; a slot in the sleeve forming two spaced apart end surfaces; and two adjusting screws engageable from an exterior surface of the body and threadable into said body transversely to the sleeve, each screw having an end surface adapted to separately engage the slot end surfaces, whereby said screws may be independently shifted to and from said slot end surfaces for rotating the sleeve relative to the plunger valve for decreasing the effective width of the throttling port.

2. An adjustable throttle valve for controlling fluid flow comprising: a body member having inlet and outlet passages; a sleeve member rotatably mounted in the body, and a plunger valve telescopically resiliently mounted in the sleeve, said plunger valve having an internal chamber; radially disposed, axially spaced apart, inlet and outlet ports in the sleeve and plunger valve, said sleeve ports being separately continuously connected to the body passages and directly overlying the valve ports, which open to the chamber, in the wide open position of the throttling valve, one of said sleeve and associated underlying valve ports together forming a throttling port; a slot in the sleeve forming two spaced apart end surfaces; two adjusting screws engageable from an exterior surface of the body and threadable into said body transversely to the sleeve, each screw having an end surface adapted to separately engage the slot end surfaces, whereby said screws may be independently shifted to and from said slot end surfaces for rotating the sleeve relative to the plunger valve for decreasing the effective width of the throttling port; and means associated with the plunger valve extending from the body member for shifting the plunger valve axially relative to the sleeve member for gradually decreasing the effective length of the throttling port.

3. An adjustable throttle valve for controlling fluid flow comprising: a body member having a longitudinal bore, spaced apart inlet and outlet cavities or recesses surrounding said bore, and inlet and outlet passages respectively connected to the inlet and outlet recesses; a sleeve member rotatably mounted in the bore, and a plunger valve telescopically resiliently mounted in the sleeve, said plunger valve having an internal chamber; radially disposed, axially spaced apart, inlet and outlet ports in the sleeve and plunger valve, said sleeve ports opening exteriorly to the inlet and outlet recesses and said valve ports opening interiorly to the valve chamber and exteriorly to the sleeve ports in direct underlying relation in the wide open position of the throttle valve, one of said sleeve ports and associated underlying plunger valve port together forming a throttling port; means for both rotating said sleeve to decrease the width of the throttling port and for locking said sleeve to adjusted position; means associated with the plunger valve extending from the body member for shifting the plunger valve axially relative to the sleeve member for gradually decreasing the effective length of the throttling port and to a position completely closing the throttling port; a passage interconnecting the valve bore inlet and outlet recesses; and a needle valve in said passage adjustable to variably open or close communication between said recesses.

4. An adjustable throttle valve for controlling fluid flow comprising: a body member having a longitudinal bore, spaced apart inlet and outlet cavities or recesses surrounding said bore, and inlet and outlet passages respectively connected to the inlet and outlet recesses; a sleeve member rotatably mounted in the bore, and a plunger valve telescopically resiliently mounted in the sleeve, said plunger valve having an internal chamber; radially disposed, axially spaced apart, inlet and outlet ports in the sleeve and plunger valve, said sleeve ports opening exteriorly to the inlet and outlet recesses and said valve ports opening interiorly to the valve chamber and exteriorly to the sleeve ports in direct underlying relation in the wide open position of the throttle valve, one of said sleeve ports and associated underlying plunger valve port together forming a throttling port; means for both rotating said sleeve to decrease the width of the throttling port and for locking said sleeve to adjusted position; means associated with the plunger valve extending from the body member for shifting the plunger valve axially relative to the sleeve member for gradually decreasing the effective length of the throttling port and to a position completely closing the throttling port; a passage interconnecting the valve bore inlet and outlet recesses; and manually adjustable valve means in said passage for variably opening and closing communication between said recesses.

5. An adjustable throttle valve for controlling fluid flow comprising: a body member having inlet and outlet passages; a sleeve member rotatably mounted in the body and a plunger valve telescopically resiliently mounted in the sleeve, said plunger valve having an internal chamber; radially disposed, axially spaced apart, rectilinear in form, inlet and outlet ports in the sleeve and plunger valve, said sleeve ports being separately continuously connected to the body passages and directly overlying the valve ports, which open to the chamber, in the wide open position of the throttling valve, one of said sleeve and associated underlying valve ports together forming a throttling port; a slot in the sleeve forming two spaced apart end surfaces; and two adjusting screws engageable from an exterior surface of the body and threadable into said body transversely to the sleeve, each screw having an end surface adapted to separately engage the slot end surfaces, whereby said screws may be independently shifted to and from said slot end surfaces for rotating the sleeve relative to the plunger valve for decreasing the effective width of the throttling port.

6. An adjustable throttle valve for controlling fluid flow comprising: a body member having inlet and outlet passages, a sleeve member rotatably mounted in the body and a plunger valve telescopically resiliently mounted in the sleeve, said plunger valve having an internal chamber; radially disposed, axially spaced apart, rectilinear in form, inlet and outlet ports in the sleeve and plunger valve, said sleeve ports being separately continuously connected to the body passages and directly overlying the valve ports, which open to the chamber, in the wide open position of the throttling valve, one of said sleeve and associated underlying valve ports together forming a throttling port; a slot in the sleeve forming two spaced apart end surfaces; and two adjusting screws engageable from an exterior surface of the body and threadable into said body transversely to the sleeve, each screw having an end surface adapted to separately engage the slot end surfaces, whereby said screws may be independently shifted to and from said slot end surfaces for both rotating the sleeve relative to the plunger valve for decreasing the effective width of the throttling port and for locking the sleeve to adjusted position.

7. An adjustable throttle valve for controlling fluid flow comprising: a body member having a longitudinal bore, spaced apart inlet and outlet cavities or recesses surrounding said bore, and inlet and outlet passages respectively connected to the inlet and outlet recesses; a sleeve member rotatably mounted in the bore, and a plunger valve telescopically resiliently mounted in the sleeve, said plunger valve having an internal chamber; diametrically opposed pairs of inlet and outlet ports in the sleeve and plunger valve, said pair of sleeve inlet and pair of sleeve outlet ports opening exteriorly to the inlet and outlet recesses and overlying, in the wide open position of the throttle valve, the diametrically opposed valve plunger pair of inlet and pair of outlet ports which open interiorly to the valve chamber, two of said correlated pairs of sleeve and plunger valve ports together forming throttling ports; means for both rotating said sleeve to decrease the width of the throttling ports and for locking said sleeve to adjusted position; means associated with the plunger valve extending from the body member for shifting said plunger valve axially to gradually decrease the length of said throttling ports and to a position completely closing the throttling ports; passage means interconnecting the inlet and outlet recesses; and manually adjustable valve means in said passage for variably restricting and closing said passage.

References Cited in the file of this patent

UNITED STATES PATENTS

| | | |
|---|---|---|
| 1,980,096 | Rowley | Nov. 6, 1934 |
| 2,158,342 | Trader | May 16, 1939 |
| 2,322,518 | Huber | June 22, 1943 |
| 2,497,664 | Gray | Feb. 14, 1950 |
| 2,659,384 | Lowe | Nov. 17, 1953 |
| 2,841,174 | Frye | July 1, 1958 |
| 2,848,186 | Bayer | Aug. 19, 1958 |

FOREIGN PATENTS

| | | |
|---|---|---|
| 635,023 | Great Britain | of 1950 |
| 780,191 | Great Britain | July 31, 1957 |